United States Patent [19]

Zushi

[11] Patent Number: 5,183,615
[45] Date of Patent: Feb. 2, 1993

[54] MOLDING METHOD OF AIR BAG COVER
[75] Inventor: Takayasu Zushi, Shiga, Japan
[73] Assignee: Takata Corporation, Tokyo, Japan
[21] Appl. No.: 777,633
[22] Filed: Oct. 16, 1991
[30] Foreign Application Priority Data Nov. 13, 1990 [JP] Japan .................. 2-306623

[51] Int. Cl.⁵ ................. B29C 45/16; B29C 45/40
[52] U.S. Cl. ................. 264/219; 264/255;
264/259; 264/313; 264/328.7; 264/328.8;
264/328.11; 264/334; 425/438; 425/443;
425/556; 425/577; 425/DIG. 58
[58] Field of Search .......... 425/577, 588, 592, 595,
425/574, 575, 590, 593, 555, 441, 443, 438,
451.2, 451.5, 451.6, 451.9, DIG. 58, 554, 556;
264/318, 334, 297.2, 328.1, 328.7, 328.8, 328.9,
328.12, 328.11, 328.13, 255, 259, 219, 313

[56] References Cited
U.S. PATENT DOCUMENTS

| 4,123,494 | 10/1978 | Evrard et al. | 264/318 X |
|---|---|---|---|
| 4,136,150 | 1/1979 | Darnall, Jr. | 264/334 X |
| 4,327,051 | 4/1982 | Edmondson | 264/318 |
| 4,362,291 | 12/1982 | Fuke et al. | 425/DIG. 58 X |
| 4,541,605 | 9/1985 | Kubota et al. | 425/DIG. 58 X |
| 4,695,421 | 9/1987 | Takeda et al. | 264/318 |
| 4,731,014 | 3/1988 | Von Holdt | 264/318 X |
| 4,756,865 | 7/1988 | Von Holdt | 264/334 |
| 4,854,849 | 8/1989 | Sudo | 264/318 X |
| 4,935,188 | 6/1990 | Sorensen | 264/328.7 |
| 5,053,182 | 10/1991 | Hedgewick | 264/318 |

FOREIGN PATENT DOCUMENTS

| 664140 | 6/1963 | Canada | 264/318 X |
|---|---|---|---|
| 1159013 | 7/1969 | United Kingdom . | |
| 1174886 | 12/1969 | United Kingdom . | |
| 1418621 | 12/1975 | United Kingdom . | |
| 2132934 | 7/1984 | United Kingdom . | |
| 2135236 | 8/1984 | United Kingdom . | |

Primary Examiner—Karen Aftergut
Attorney, Agent, or Firm—Kanesaka and Takeuchi

[57] ABSTRACT

A molding method is used to produce a module cover for an air bag device which has undercut portions in mounting edge portions thereof. A lower mold disposed inside the module cover to be produced is of the split type so that is includes a central mold disposed at the center and a plurality of lateral molds for molding of the undercut portions. The mating face of the central mold with each lateral mold is oblique so that its bottom is closer to the edge of the module cover than its top. Thus, the module cover produced can be detached from the lower mold by moving the lateral molds mutually inward.

2 Claims, 9 Drawing Sheets

MOLDING METHOD OF AIR BAG COVER

FIELD OF THE INVENTION

This invention relates to a method of molding a cover for housing an air bag device capable of inflating and expanding upon detection of impact, collapse and the like resulting from a vehicle collision.

RELATED ART

Air bag device comprises an air bag which expands rapidly in case of emergency, for example, when a vehicle collides. As shown in FIG. 16, an air bag 2 is normally folded and covered with a module cover 1. Conventionally, the air bag 2 together with an inflator 4 is supported by a mounting plate 3 called "retainer", and the module cover 1 is attached to the mounting plate 3 by rivets 5, screws or bolts.

As shown in FIG. 17, the air bag device is generally attached to a central section of a steering wheel 10. 10A designates a spoke of the steering wheel 10.

The module cover 1 was generally made from ream urethane by one-layer molding. Recently, two-layer molding has been practiced to make module covers composed of a hard layer or core layer 1a and a soft layer or skin layer 1b. The module cover 1 shown in FIG. 16 is of the two-layer molding type. The module cover 1 is formed with a groove-like rupture-initiating line or tear line 1A which causes the cover to rupture when the air bag 2 expands. The tear line 1A is a portion whose mechanical strength is smaller than that of the other, or is made thin to the order of 0.5 to 1.0 mm in thickness, whereby the module cover 1 can rupture along the tear line 1A when the air bag 2 expands.

In FIG. 16, 1B designates a decorative line, and 6 designates a body cover.

Conventionally, the module cover for the air bag is made from urethane foam-integral skin foam or thermoplastic resin by injection molding using a metal mold assembly of given configuration.

However, when producing the module cover for the air bag device from synthetic resin, if the module cover is to be formed with undercut portions, an excessive force tends to be imposed on products when detaching from the mold assembly, resulting in cover deformation.

OBJECT AND SUMMARY OF THE INVENTION

Is is an object of the present invention to provide a molding method of an air bag cover which allows detaching of the molded cover from a mold assembly without cover deformation.

To accomplish the foregoing object, the present invention provides a method of molding a module cover for an air bag device, the module cover having undercut portions in mounting edge portions thereof, which is characterized in that a lower mold disposed inside the module cover to be produced is of the split type so that it is composed of a central mold disposed at the center and a plurality of lateral molds for molding of the undercut portions, and the mating face of the central mold with each lateral mold is oblique so that its bottom is closer to the edge of the module cover than its top, whereby the module cover produced can be detached from the lower mold by moving the lateral molds mutually inward.

As will be appreciated, according to the present invention, by moving the lateral molds mutually inward, the module cover produced can be detached from the metal mold assembly without any hindrance being caused by the undercut portions. That is, the module cover having the undercut portions produced can be detached from the metal mold assembly without imposing any excessive force on the cover; thus, the cover undergoes no deformation in manufacture and can be produced efficiently.

BRIEF DESCRIPTION OF THE DRAWINGS

FIGS. 1 through 10 relate to an embodiment of the present invention, in which

FIG. 1 is a plan view of a module cover;

FIG. 2 is a sectional view taken along the line II—II in FIG. 1;

FIG. 3 is a sectional view taken along the line III—III in FIG. 1;

FIG. 4 is a plan view of a metal mold assembly;

FIG. 5 is a sectional view taken along the line V—V in FIG. 4;

FIG. 6 is a sectional view taken along the line VI—VI in FIG. 4; and

FIGS. 7 through 10 are sectional views showing the procedure for detaching the molded cover from the metal mold assembly;

FIGS. 11 through 15 relate to another embodiment of the present invention, in which FIG. 11 is a plan view of another metal mold assembly;

FIG. 12 is a sectional view taken along the line XII—XII in FIG. 11;

FIG. 13 is a sectional view taken along the line XIII—XIII in FIG. 11; and

FIGS. 14 and 15 are sectional views showing the detaching procedure;

DESCRIPTION OF THE PREFERRED EMBODIMENTS

Embodiments of the present inventions will now be described in greater detail with reference to the drawings.

Figure 1:
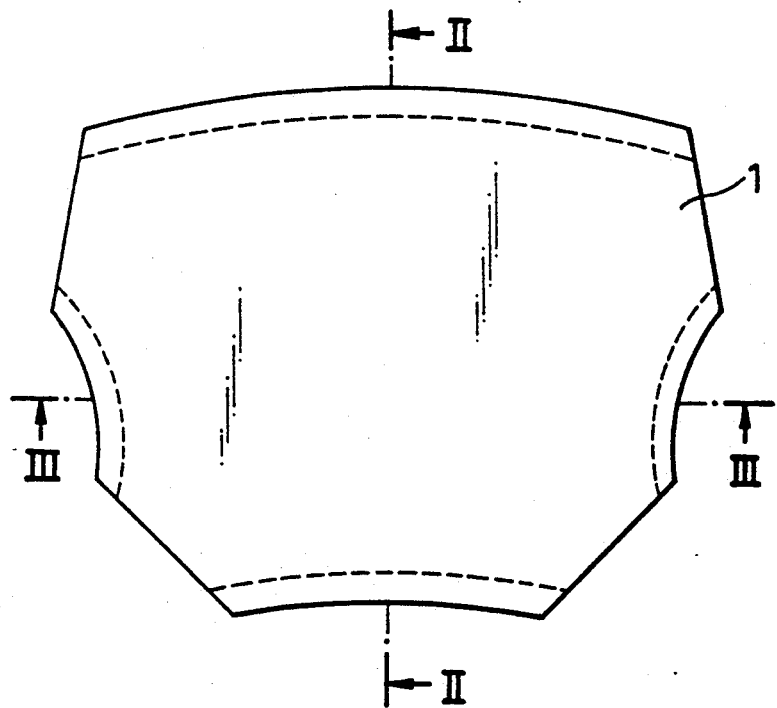
Figure 2:
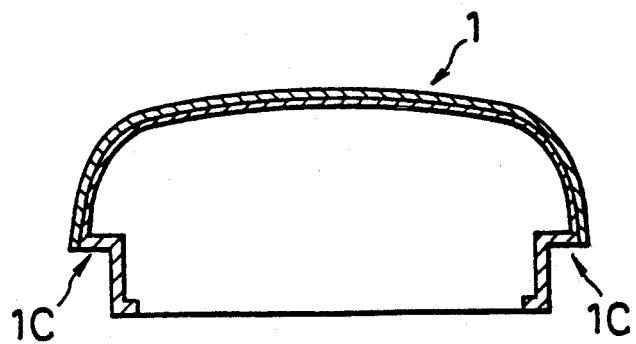
Figure 3:
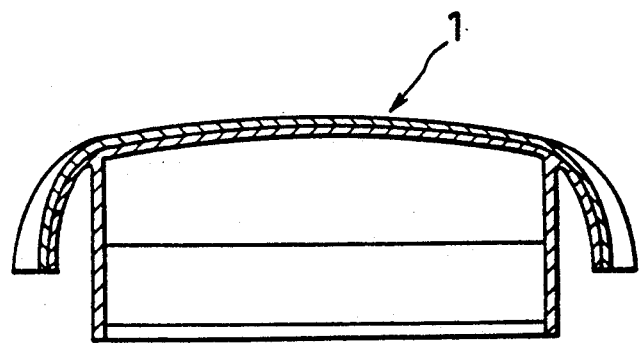
Figure 4:
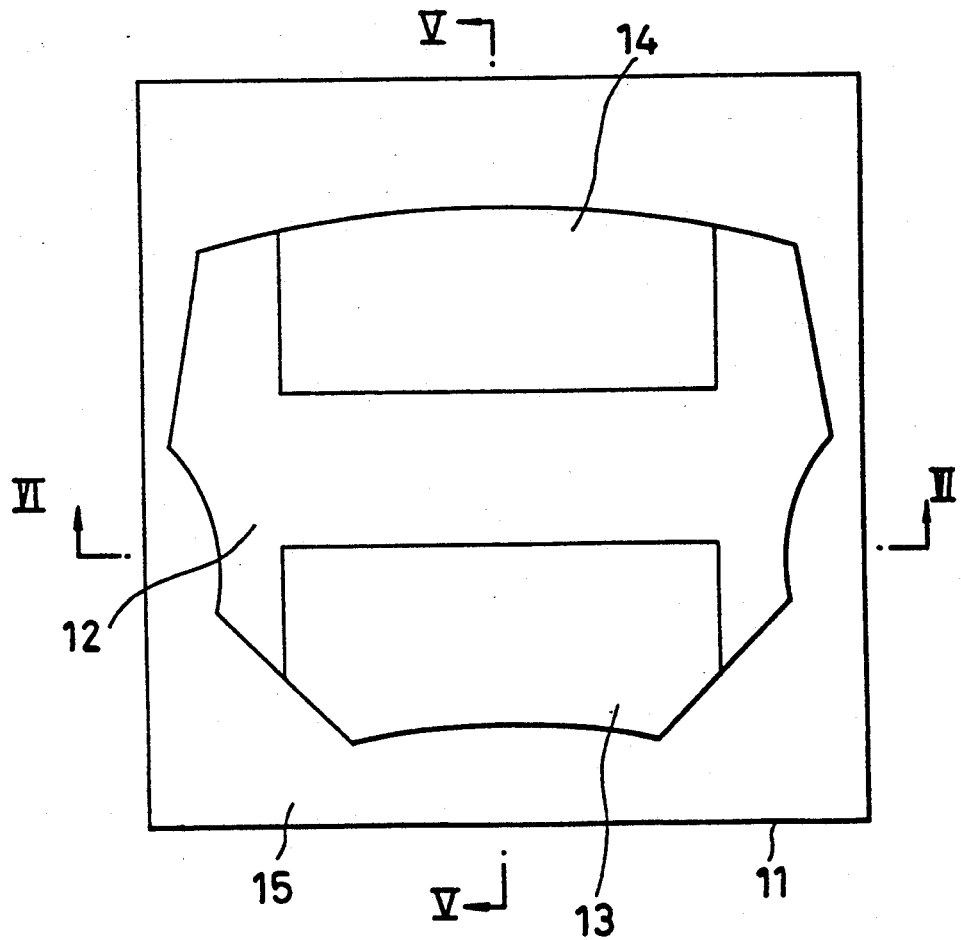
Figure 5:
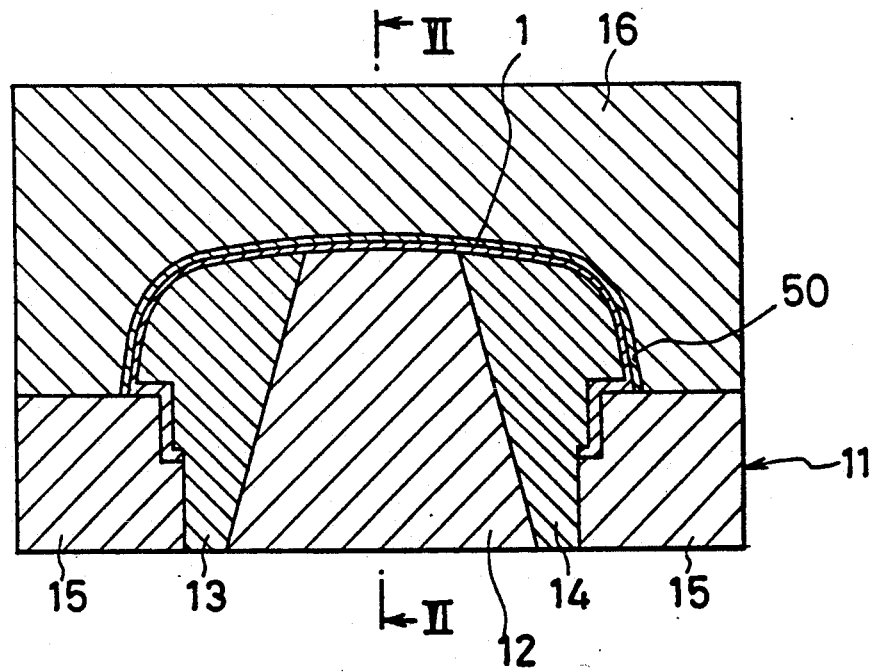
Figure 6:
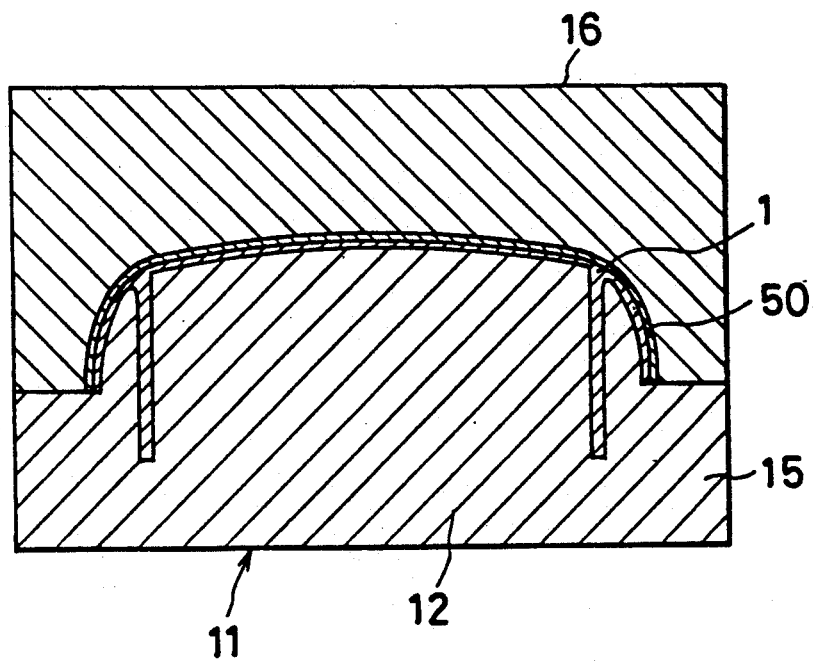

FIGS. 1 through 10 illustrate an embodiment of the present invention. As shown in FIGS. 1 through 3, a module cover 1 will be molded which has undercut portions 1C in opposing edge portions thereof. As shown in FIGS. 4 through 6, a lower mold 11 forming a part of a metal mold assembly for use in this embodiment is composed of a central mold 12 for molding of a hollow central section of the module cover 1, first and second lateral molds 13 and 14 for molding of the undercut portions of a hollow lateral section, and a frame mold 15 for molding of a peripheral section. The central mold 12 is made integral with the frame mold 15. The mating face of the central mold 12 with each of the first and second lateral molds 13 and 14 is oblique so that its bottom is closer to the edge of the module cover 1 than its top. On the other hand, the mating face of the frame mold 15 with each of the first and second lateral molds 13 and 14 is substantially vertical. 16 designates an upper mold.

Figure 7:
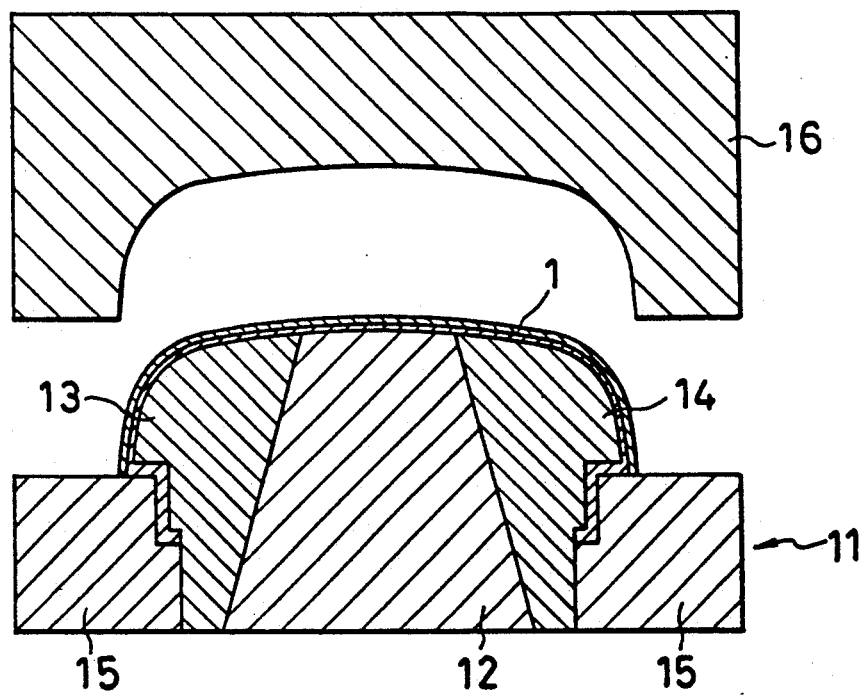
Figure 8:
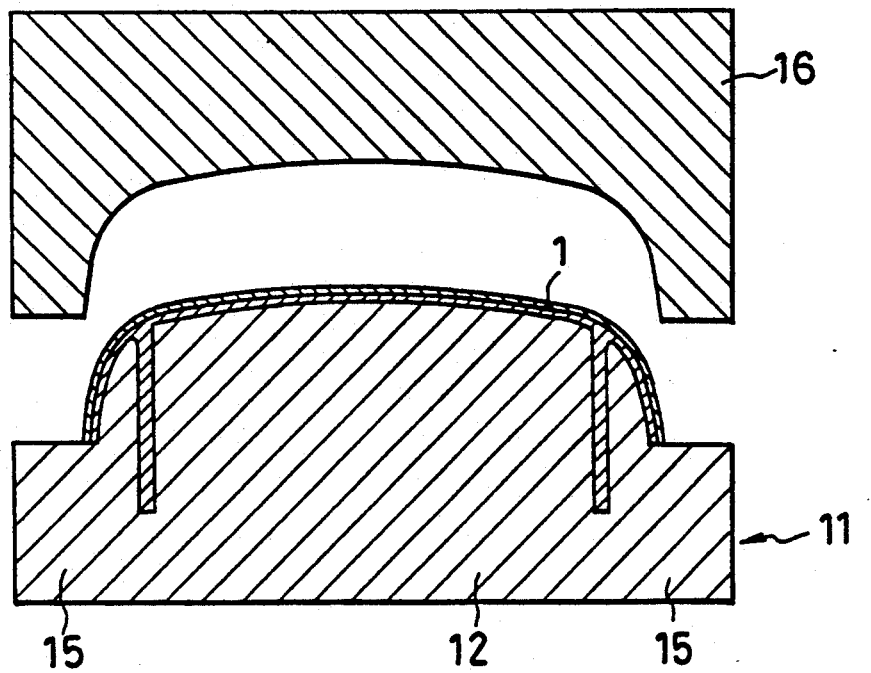
Figure 9:
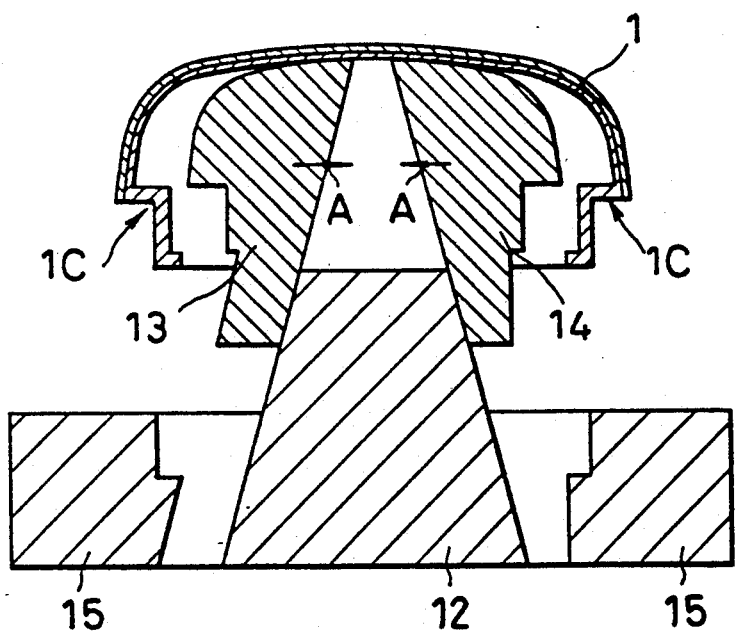
Figure 10:
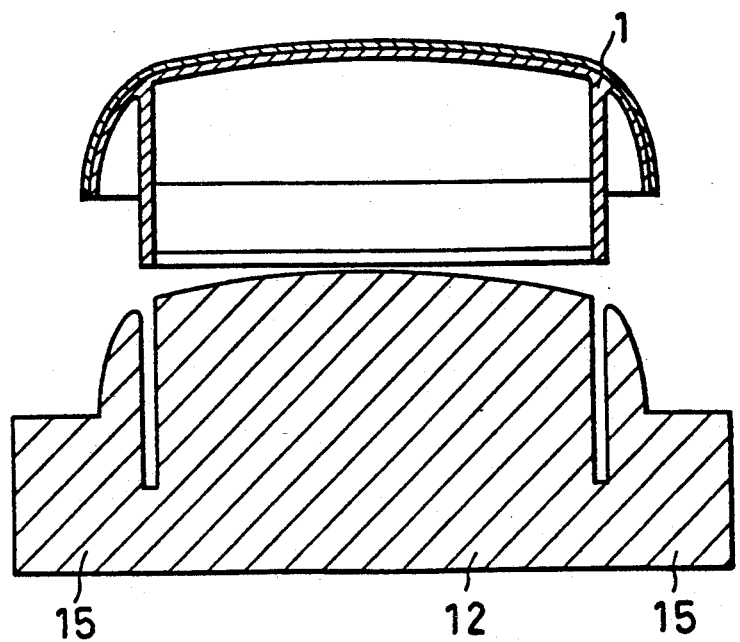

As shown in FIGS. 5 and 6, the module cover 1 is molded by clamping the upper mold 16 and the lower mold 11 together, injecting a resin material into a cavity 50 defined between these molds, and hardening/curing the injected resin material. Specifically, to form a core layer, a first upper mold of relatively small size is clamped to the lower mold 11, a resin material is injected, and the injected material is hardened/cured. Then, to form a skin layer, the first mold is removed, a second upper mold of relatively large size is clamped to the lower mold with the core layer left thereon, another resin material is injected into a different cavity defined between them, and the injected material is hardened/cured. When detaching the molded cover from the metal mold assembly, as shown in FIGS. 7 and 8, the upper mold 16 is moved up. Then, as shown in FIGS. 9 and 10, the first and second lateral molds 13 and 14 are moved up along the mating faces of the central mold 12. As described above, the mating face of the central mold 12 with each of the first and second lateral molds 13 and 14 is oblique so that its bottom is closer to the edge of the module cover 1 than its top, and the mating face of the frame mold 15 with each of the first and second lateral molds 13 and 14 is substantially vertical; therefore, the first and second lateral molds 13 and 14 can readily be moved up without imposing any extra force on the module cover 1. After the first and second lateral molds 13 and 14 are moved up, they are moved mutually inward in the direction of the arrows A in FIG. 9; therefore, the undercut portions 1C of the module cover 1 come out of contact with the lateral molds 13 and 14. Accordingly, the module cover 1 produced can readily be detached from the metal mold assembly without undergoing any deformation.

Figure 11:
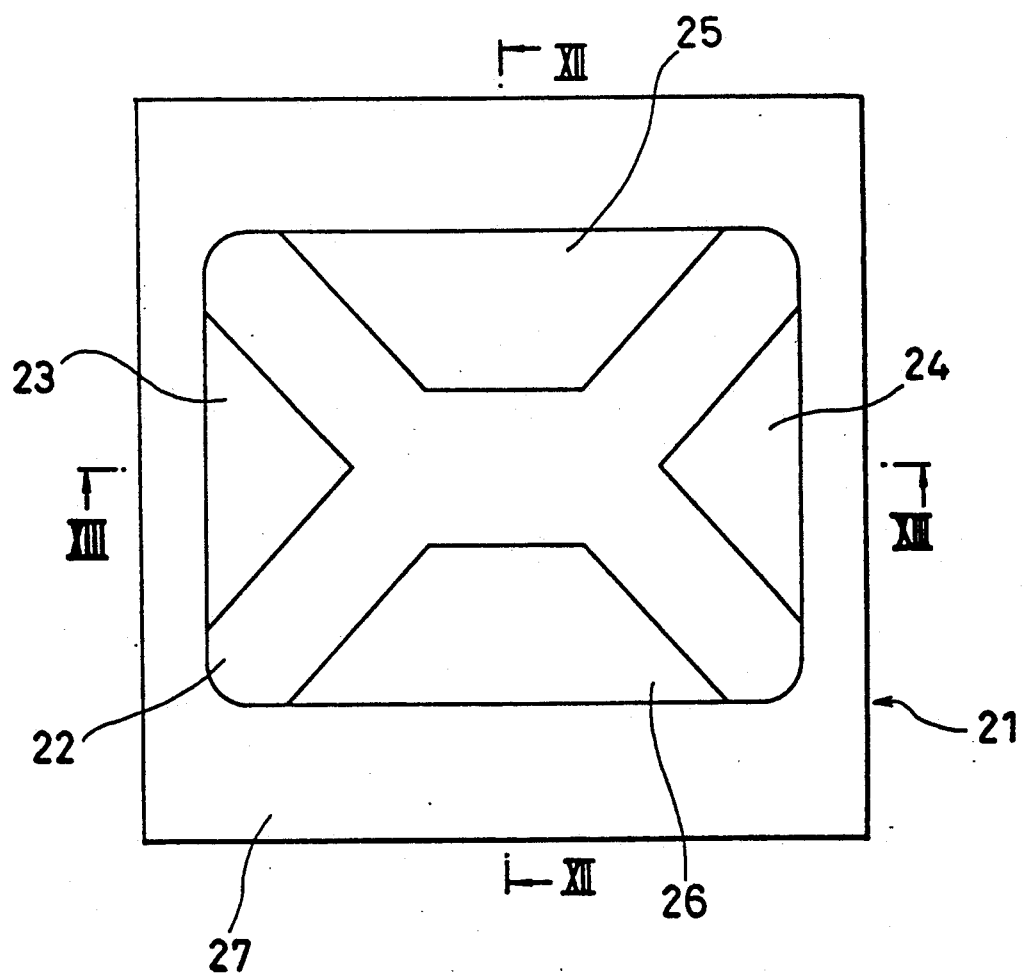
Figure 12:
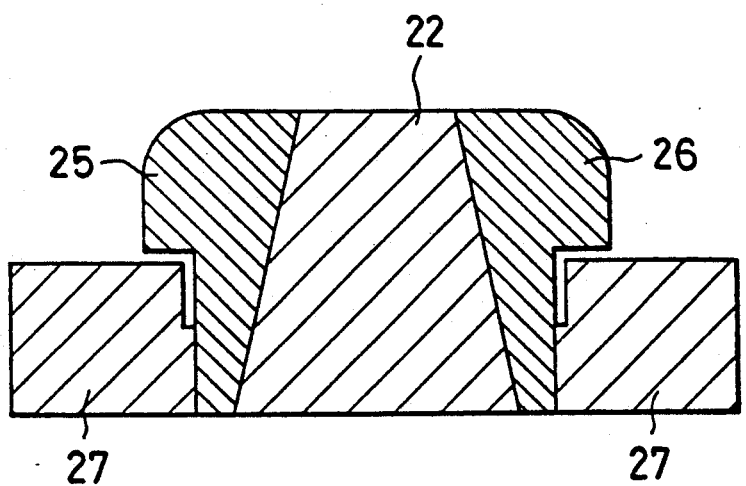
Figure 13:
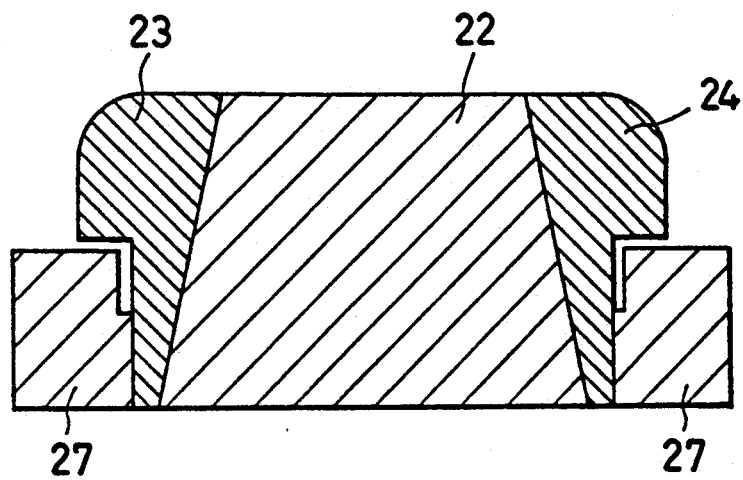

FIGS. 11 through 15 illustrate another embodiment of the present invention, which intends to mold a module cover having undercut portions in all edge portions thereof. As shown in FIGS. 11 through 13, a lower mold 21 forming a part of a metal mold assembly for use in this embodiment is composed of a central mold 22 for molding of a hollow central section of the module cover, first, second, third and fourth lateral molds 23, 24, 25 and 26 for molding of the undercut portions of a hollow lateral section, and a frame mold 27 for molding of a peripheral section. The central mold 22 is made integral with the frame mold 27. The mating face of the central mold 22 with each of the first through fourth lateral molds 23 through 26 is oblique so that its bottom is closer to the edge of the module cover (not shown) than its top. On the other hand, the mating face of the frame mold 27 with each of the first through fourth lateral molds 23 through 26 is substantially vertical.

Figure 14:
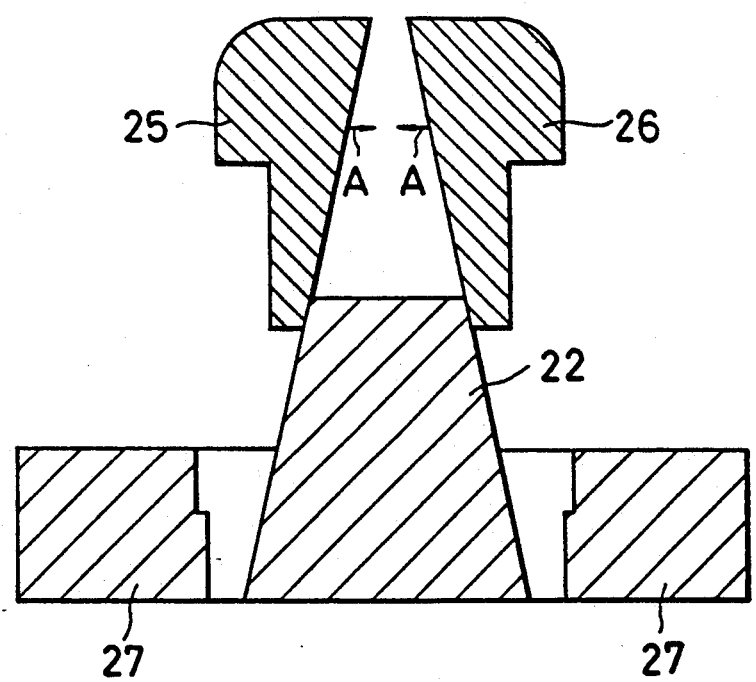
Figure 15:
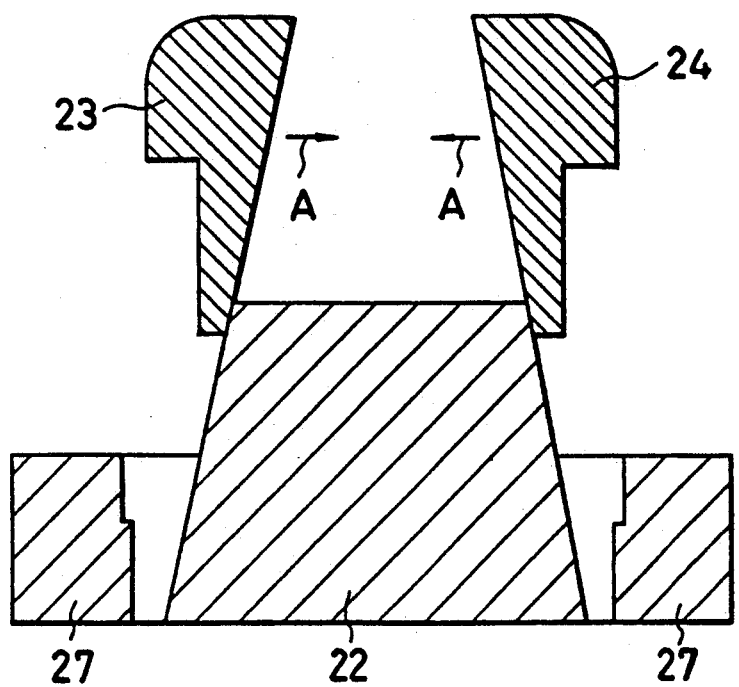
Figure 16:
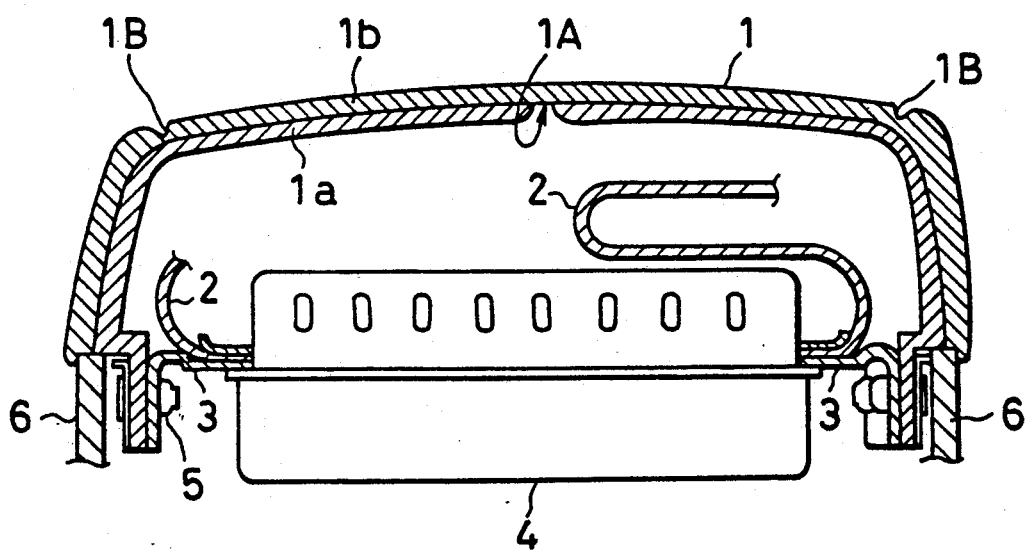
FIG. 16 is a sectional view of an air bag device.
Figure 17:
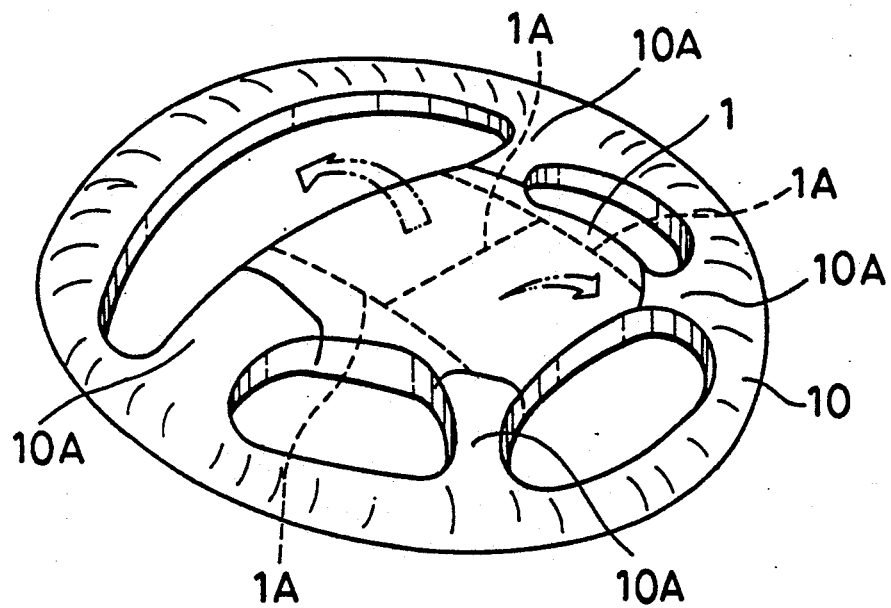
FIG. 17 is a perspective view showing the mounted state of the air bag device.

In the embodiment, the module cover (not shown) is molded by clamping the upper mold (not shown) and the lower mold 21 together and injecting a resin material. When detaching the molded cover from the metal mold assembly, as shown in FIGS. 12 and 13, the upper mold (not shown) is moved up. Then, as shown in FIGS. 14 and 15, the central mold 22 integral with the frame mold 27 is moved down. In connection with this downward movement, since the mating face of the central mold 22 with each of the first through fourth lateral molds 23 through 26 is oblique so that its bottom is closer to the edge of the module cover than its top and the mating face of the frame mold 27 with each of the first through fourth lateral molds 23 through 26 is substantially vertical, the central mold 22 together with the frame mold 27 can readily be moved down without imposing any extra force on the module cover. After the central mold 22 is moved down, the first and second lateral molds 23 and 24 are moved mutually inward in the directions of the arrows A in FIG. 15, and the third and fourth lateral molds 25 and 26 are also moved mutually inward in the directions of the arrows A in FIG. 14; therefore, there is no fear that the undercut portions of the module cover will come into contact with the lateral molds 23 through 26. Then, the lateral molds 23 through 26 are moved down. Accordingly, the module cover produced can readily be detached from the metal mold assembly without undergoing any deformation.

The foregoing processes are illustrative and are not to be construed as limiting the method of the present invention. For example, the manner of splitting the lower mold, the mold configuration, the degree of inclination of the mating face of the central mold or lateral mold, etc. may be modified without departing from the spirit of the present invention. Further, the mating face of the lateral mold with the frame mold may be made oblique.

What is claimed is:

1. A method of molding a module cover for an air bag device of first and second synthetic resin materials, the module cover having a main cover portion, edge portions, and at least one pair of undercut portions formed at the edge portions of the main cover portion, comprising, preparing first and second upper molds for forming an outside of the main cover portion, and a lower mold for forming an inside of the main cover portion and the undercut portions, the first upper mold being smaller than the second upper mold, the lower mold including a central mold for molding a central section of the inside of the main cover portion, at least one pair of lateral molds for molding side sections of the inside of the main cover portion and insides of the edge portions and the undercut portions, the pair of lateral molds being arranged symmetrical to the central mold, and a frame mold for molding outsides of the edge portions and the undercut portions, the central mold and the frame mold being connected together as one unit, the central mold and the lateral molds having oblique mating faces so that the lateral molds are slidable laterally to be located above the central mold away from the edge portions of the module cover, disposing the first upper mold over the lower mold to define a first cavity therebetween, injecting the first resin material into the first cavity and hardening the first resin material to form a core layer comprising the main cover portion, the edge portions and the undercut portions of the module cover, removing the first upper mold and placing the second upper mold over the main cover portion of the core layer in engagement with the lower mold, to form a second cavity between the core layer and the second upper mold about the main cover portion of the core layer, injecting the second resin material into the second cavity and hardening the second resin material to form a skin layer over the main cover portion of the core layer, removing the second upper mold from the skin layer, separating the frame mold and the central mold as one unit from the core layer while moving inside the core layer the lateral molds toward each other slidably along the oblique mating faces of the lateral molds and the central mold so that the lateral molds are located away from the edge portions of the core layer, and removing the lateral molds from the core layer to form the module cover comprising the main cover portion, the edge portions, and the at least one pair of undercut portions formed at the edge portions, wherein the main cover portion includes the core layer of the first synthetic resin material and the skin layer of the second synthetic resin material.

2. A molding method according to claim 1, wherein the module cover is laterally elongated, the undercut portions being formed at laterally elongated portions of the module cover, the lateral molds being arranged to be movable relative to the laterally elongated portions of the module cover.

* * * * *